United States Patent [19]

Olstowski et al.

[11] 3,996,172

[45] Dec. 7, 1976

[54] NON-ELASTOMERIC POLYURETHANE COMPOSITIONS

[75] Inventors: Franciszek Olstowski, Freeport; Donald B. Parrish, Lake Jackson, both of Tex.

[73] Assignee: The Dow Chemical Company, Midland, Mich.

[22] Filed: Dec. 17, 1973

[21] Appl. No.: 425,489

Related U.S. Application Data

[63] Continuation-in-part of Ser. No. 366,835, June 4, 1973, which is a continuation-in-part of Ser. No. 179,149, Sept. 9, 1971, abandoned.

[52] U.S. Cl. .................... 260/18 TN; 260/22 EP; 260/77.5 AM; 260/77.5 AP
[51] Int. Cl.² .................... C08G 18/48
[58] Field of Search ... 260/18 TN, 22 TN, 77.5 AP, 260/77.5 AM

[56] References Cited

UNITED STATES PATENTS

| 3,102,875 | 9/1963 | Heiss | 260/77.5 |
|---|---|---|---|
| 3,255,500 | 6/1966 | Engel et al. | 260/18 |
| 3,395,108 | 7/1968 | Cobbledick et al. | 260/18 |
| 3,425,973 | 2/1969 | Shaw, Jr. | 260/18 |
| 3,505,250 | 4/1970 | Saunders | 260/18 |
| 3,546,148 | 12/1970 | Diamond et al. | 260/18 |
| 3,755,222 | 8/1973 | Gruber et al. | 260/18 |

Primary Examiner—Eugene C. Rzucidlo
Attorney, Agent, or Firm—Raymond B. Ledlie

[57] ABSTRACT

Mixtures comprising a low molecular weight polyol having a functionality of from 3 to about 8, a liquid modifier compound having a boiling point above 150° C, such as a fatty acid or fatty oil, a polyisocyanate and a non-amine-containing catalyst, instantly set, after a brief induction period, to a solid, dense, non-elastomeric polymeric product which can be demolded within a period of from less than about 1 minute to about 5 minutes.

25 Claims, No Drawings

NON-ELASTOMERIC POLYURETHANE COMPOSITIONS

This application is a continuation-in-part of our co-pending application Ser. No. 366,835, filed June 4, 1973 which is a continuation-in-part of application Ser. No. 179,149, filed Sept. 9, 1971, now abandoned.

This invention relates to polyurethane compositions and more particularly relates to rapid-setting, solid, dense, non-elastomeric polyurethane compositions.

Rapid setting, dense, opaque polyurethane compositions have been taught in U.S. Pat. No. 3,378,511. Such compositions employ, as one of the essential ingredients, a liquid plasticizer which is a dicarboxylic acid ester. These compositions while useful in many applications, have some disadvantages in that they are not readily paintable and are susceptible to degradation in such common solvents as acetone, methyl isobutylketone, methylene chloride, ethylene dichloride, ethyl acetate, tetrahydrofuran and the like.

The present invention provides one or more of the following advantages over the prior art, i.e. improved detail reproduction in ornamental castings having intricate detail, improved paintability, improved solvent resistance, improved lubricity in cast gears and other machine elements and the like.

It is an object of the present invention to provide a rapid-setting, dense, rigid polyurethane composition.

Another object of the present invention is to provide rapid-setting, non-elastomeric, opaque polyurethane compositions.

A further object of the present invention is to provide rapid-setting, dense, non-elastomeric, transparent polyurethane compositions.

These and other objects will become apparent from a reading of the following detailed specification.

The present invention concerns a composition which comprises a polyether polyol, an organic polyisocyanate and a non-amine-containing catalyst for urethane formation, characterized in that it contains a liquid modifier compound having a boiling point above about 150° selected from the group consisting of hydroxyl-containing and non-hydroxyl-containing polyoxyalkylene compounds, ester-modified polyoxyalkylene compounds, fatty acids, naturally occurring fatty oils, organic phosphates, organic phosphites, organic phosphonates, cyclic ethers, non-ester-containing aromatic compounds, partially hydrogenated aromatic compounds, organic carbonates, halogenated aliphatic compounds, cyclic sulfones and mixtures thereof.

All the liquid modifier compounds have at least two points in common. They are (1) an apparent ability to act as a heat sink to prevent excessive bubbling which would result from the heat generated by the exothermic heat of reaction and (2) they have boiling points at atmospheric pressure above about 150° C.

The term non-elastomeric polyurethane as employed herein is defined as a polyurethane product having an elongation value of less than 80 percent and the term dense is defined as a density of at least about 1 gram/cc.

Non-elastomeric, rapid-setting, polyurethane compositions are obtained by intimately admixing together a composition comprising A. a polyether polyol which is the adduct of a polyhydric initiator compound having a functionality of from 3 to about 8 with a vicinal epoxy compound, said polyol having a hydroxyl equivalent weight of at least about 75 and less than about 230;

B. an organic polyisocyanate;

C. a liquid modifier compound having a boiling point above about 150° C at atmospheric pressure including for example hydroxyl-containing and non-hydroxyl-containing polyoxyalkylene compounds, fatty acids, naturally occuring fatty oils, organic phosphates, organic phosphites, organic phosphonates, cyclic ethers, non-ester containing aromatic compounds, partially hydrogenated aromatic compounds, organic carbonates, halogenated aliphatic compounds, cyclic sulfones, and mixtures thereof in any combination, and D. a non-amine containing catalyst for urethane formation;

and wherein Components (A) and (B) are present in amounts so as to provide an NCO:OH ratio of from about 0.8:1 to about 2:1 and preferably from about 0.95:1 to about 1.1:1; Component C is present in quantities of from about 20–50% and preferably from about 30–50% with the proviso that when component (B) is a prepolymer containing less than about 40% NCO groups by weight, then component (C) is present in quantities of from about 10% to about 50% by weight of the sum of Components (A), (B), and (C); and (D) is present in quantities of from about 0.2 to about 10%, preferably from about 0.2 to about 3%, and most preferably from about 0.5 to about 3% by weight of the sum of the weights of Components (A), (B) and (C); with the proviso that when Component (C) is a halogenated aliphatic compound, it is employed in a range of from about 0.2 to about 50 percent by weight of the sum of the weights of Components (A), (B) and (C); that when the halogenated aliphatic compound also contains hydroxyl groups and has an OH equivalent weight of less than about 500, it is employed in quantities of from about 0.2 to about 5 percent by weight based upon the sum of the weight of Components (A), (B) and (C), and that when Component (C) is a non-ester-containing aromatic compound or a halogenated aliphatic compound, the non-amine-containing catalyst, Component (D), is employed in quantities of from about 0.01 to about 10 percent by weight of the combined weights of Components (A), (B) and (C).

Suitable initiator compounds having from 3 to 8 hydroxyl groups which can be employed to prepare the polyols (Component A) employed in the present invention include, for example, glycerine, trimethylolpropane, pentaerythritol, sorbitol, sucrose, mixtures thereof and the like.

Suitable vicinal epoxy compounds which may be reacted with the initiator compounds to prepare the polyols employed as Component A in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiodohydrin, styrene oxide, mixtures thereof and the like.

Suitable polyoxyalkylene compounds which may be employed as the liquid modifier compound (Component C) include, for example, 1. a liquid, totally-capped or non-hydroxyl-containing block or randomly formed polyoxyalkylene glycol represented by the general formula I. 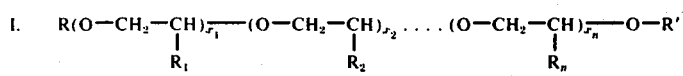

wherein R and R' are independently selected from saturated and unsaturated hydrocarbon groups having from about 1 to about 6, preferably from about 1 to about 3, carbon atoms; $R_1$, $R_2$, ... and $R_n$ are independently hydrogen, an aryl group, an alkyl group or haloalkyl group, said alkyl or haloalkyl group having from about 1 to about 2 carbon atoms with the proviso that when $R_1$, $R_2$ ... $R_n$ is a haloalkyl group, it is present in minor amounts i.e. a ratio of from about 0 to about 10 percent of the total $R_1$, $R_2$ ... $R_n$ groups, and $x_1$, $x_2$, ... $x_n$ are integers, such that the boiling point of the liquid capped polyalkylene glycol is above about 150° C;

2. a liquid partially capped, block or randomly formed polyoxyalkylene compound represented by the general formula II. 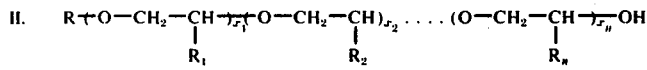

wherein R and $R_1$, $R_2$ ... $R_n$ are as defined in formula I above and $x_1$, $x_2$, ... $x_n$ are integers, the sum of which provides the partially capped polyoxyalkylene compound with a molecular weight of at least about 700;

3. a liquid, block or randomly formed polyoxyalkylene glycol represented by the general formula III. 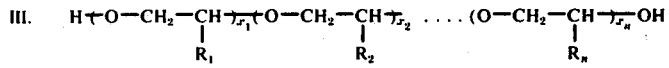

wherein $R_1$, $R_2$ ... $R_n$ are as defined in formula I above and $x_1$, $x_2$ ... $x_n$ are integers, the sum of which provides the polyoxyalkylene glycol with an equivalent weight of at least about 700, and 4. a liquid, random or block polyoxyalkylene polyol having a hydroxyl functionality of from 3 to about 8 represented by the general formula IV. 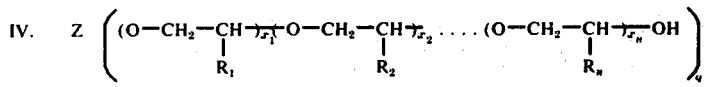

wherein $R_1$, $R_2$ ... $R_n$ are as defined in formula I above, Z is the residue of an initiator compound having from 3 to about 8 hydroxyl groups, $x_1$, $x_2$, ... $x_n$ are integers, the sum of which provides the polyoxyalkylene polyol with a hydroxyl equivalent weight of at least about 500 and $q$ is an integer having a value of from 3 to about 8.

Suitable ester-modified polyoxyalkylene compounds which may be employed as the liquid modifier compound (Component C) include, for example, those liquid ester-modified polyethers having a boiling point above about 150° C represented by the general formula V. 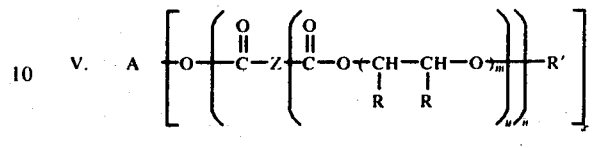

wherein A is the residue of an initiator or starting compound having from 1 to about 8 hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from 1 to 20 carbon atoms, $m$ has an average value of from about 1.0 to about 2.0 $n$ has a value from about 1 to about 5, $x$ has a value from about 1 to about 8 and $y$ has a value of 1 or 2 and wherein said ester-modified polyether compound has a hydroxyl equivalent weight above about 500 when 3 or more hydroxyl groups are present and when 2 hydroxyl groups are present, an average equivalent weight of above about 700 and when zero or one hydroxyl group is present a molecular weight of above about 700.

Suitable initiators which may be employed to prepare the liquid polyoxyalkylene and ester-modified polyoxyalkylene modifier compounds (Component C) of the present invention include compounds having from 1 to 8 hydroxyl groups such as, for example, methanol, ethanol, propanol, butanol, ethylene glycol, propylene glycol, butylene glycol, 1,6-hexane diol, glycerine, trimethylolpropane, pentaerythritol, sorbitol, sucrose, mixtures thereof and the like.

When the liquid modifier compound, Component C, is an ester modified polyether polyol, the initiator compound may also be and is preferably an adduct of the above mentioned initiator compounds and one or more of the following vicinal epoxidecontaining compounds, i.e. the initiator compound is a polyoxyalkylene compound having 1–8 hydroxyl groups, preferably 2 to about 3 or 4 hydroxyl groups.

Suitable vicinal epoxide compounds which may be reacted with the above mentioned initiator compounds to prepare the modifier compounds (Component C) employed in the present invention include, for example, ethylene oxide, 1,2-propylene oxide, 1,2-butylene oxide, 2,3-butylene oxide, a epichlorohydrin, epibromohydrin, epiodohydrin, styrene oxide, mixtures thereof and the like.

The liquid modifier compounds represented by formulae I-IV and methods for their preparation are well known in the art, e.g. U.S. Pat. Nos. 2,448,664; 2,425,755; 2,782,240 and 2,520,611. Methods for the preparation of the liquid modifier compounds represented by the formula V are given in a copending application Ser. No. 67,233, filed Aug. 26, 1970 by Robert W. McAda, Jr. for "ESTER-MODIFIED POLYETHER POLYOLS" and in U.S. Pat. No. 3,502,601.

Suitable non-ester containing aromatic compounds which may be employed as the liquid modifier compound having a boiling point above about 150° C (Component C) in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodobenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, β-chlorostyrene, mixtures thereof and the like.

The above compounds may be represented by the following general formula provided it is understood that such compounds represented by the formula are liquids and have boiling points at atmospheric pressure above about 150° C.

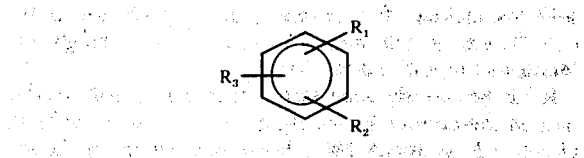

wherein $R_1$, $R_2$ and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which may be employed as the liquid modifier compound (Component C) in the present invention include liquid multi-ring compounds having a boiling point above about 150° C such as, for example, 1-chloronaphthalene, 1-bromo-naphthalene, mixtures thereof and the like.

Suitable partially hydrogenated multi-ring aromatic compounds which may be employed as the liquid modifier compound (Component C) in the present invention include, for example, 1,4-dihydronaphthalene, 1,2,3,4-tetrahydronaphthalene, mixtures thereof and the like.

Suitable fatty acids and naturally occurring fatty oils which may be employed as the liquid modifier compounds (Component C) in the present invention includes, for example, oleic acid, linoleic acid, linolenic acid, and the like. The fatty acids resulting from the hydrolysis of naturally occurring oils of animal and vegetable origin including for example, linseed oil, castor oil, tung oil, fish oil, soya oil and the like and such acids as are produced as byproducts in chemical processes including for example, tall oil, the byproduct resulting from the conversion of wood pulp to paper by the sulfate process, mixtures of any of the above and the like.

Also operable as the liquid modifier compound are the naturally occuring fatty oils having boiling points above about 150° C including, for example, linseed oil, castor oil, tung oil, fish oil, soya oil, and the like.

Suitable organophosphorus compounds which may be employed as the liquid modifier compound, Component C, include, for example, organo phosphates, organo phosphites and organo phosphonates having boiling points above about 150° C.

Organo phosphates, phosphites and phosphonates which may be employed as the liquid modifier compound include those liquid compounds represented by the formulae

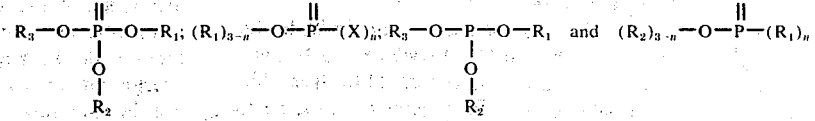

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e. chlorine, fluorine, bromine or iodine, n has a value of 1 or 2. Suitable such compounds include, for example, tri-n-butyl phosphate, triethylphosphate, tricresylphosphate, tris-(beta-chloroethyl)phosphate, tris-(2,3-dibromopropyl)phosphate, butyl dichlorophosphate, 2-chloroethyl dichlorophosphate, ethyl dichlorophosphate, diethyl fluorophosphate, bis (2-chloroethyl) fluorophosphate, dibutyl chlorophosphate, isoamyl dichlorothionophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

When halo- or dihalo-phosphates or phosphites or their thiono derivatives are employed as the liquid modifier compound (component C), they are preferably added to the composition just prior to the non-amine-containing catalyst so as to minimize their reaction with the hydroxyl groups of the polyol, component A.

The organo phosphorus compounds may be prepared by procedures described in ORGANO-PHOSPHORUS COMPOUNDS, G. M. Kosolapoff, John Wiley & Sons, Inc., 1950.

Suitable liquid organic carbonates which may be employed as the liquid modifier, component C, in the present invention include the acyclic and cyclic carbonates represented by the formulae

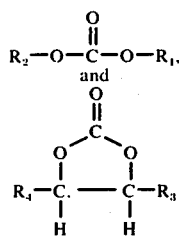

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ hydrogen.

Suitable liquid acyclic organic carbonates which may be employed in the present invention include, for example, bis(2-chloroethyl)carbonate, di-n-butyl carbonate, butyldiglycol carbonate, cresydiglycol carbonate, dibutyl carbonate, di-2-ethylhexyl carbonate, dimethallyl carbonate, dinonyl carbonate and the like. The organic acyclic carbonate may be prepared by procedures given in U.S. Pat. No. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which may be employed as the liquid modifier (component C) include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150° may be employed as the liquid modifier in the present invention including cyclic polyethers prepared from butylene oxide, epichlorohydrin and the like.

The liquid cyclic polyether modifier compounds may be prepared by procedures mentioned in "Cyclic Polyethers and Their Complexes with Metal Salts" by C. J. Pedersen, J. Am. Chem. Soc., Vol. 89, p. 7017-7036, 1968, "Twelve-Membered Polyether Rings. The Cyclic Tetramers of Some Olefin Oxides" by R. S. Kern; J. Org. Chem. Vol. 33, p. 388–390, 1968; British Pat. No. 785,229 and 1,108,921.

Suitable halogenated aliphatic compounds having a boiling point above about 150° C which may be employed as the modifier compound in the present invention include, for example, tetrabromoethane, bromoform, hexachlorobutadiene, tetrachlorobutadiene, 1,2,3,3,-tetrachlorobutane, 1,5-dibromo-pentane, 1,1,2-tribromopropane, 1,2,3-trichloropropene, polyepichlorohydrin diol having an equivalent weight above about 700 up to about 4000, chlorinated paraffins, e.g. "Chlorowax" No. 40, 1-mercapto-3-chloropropanol-2, 3-chloropropane-1,2-diol, 2-chloropropane-1,3-diol, 1,3-dichloro-2-propanol, mixtures thereof and the like.

The halogenated aliphatic compounds which do not contain hydroxyl groups may be employed in quantities of from about 0.2 to about 50 percent by weight of the sum of the weights of components A, B and C, and preferably from about 1 to about 10 percent by weight on the same basis i.e. the sum of the weights of components A, B and C. When the halogenated aliphatic compounds employed herein also contain hydroxyl groups and have a hydroxyl equivalent weight of less than 500, the quantity which is to be employed is from about 0.2 to about 10 preferably from about 0.4 to about 5 percent by weight based upon the combined weights of A, B and C.

Suitable cyclic sulfones which may be employed as the liquid modifier compound include the 5-membered cyclic sulfones such as, for example, 3-methylsulfolane (3-methyltetrahydrothiophene -1,1-dioxide) and the like.

The term "liquid modifier boiling above about 150° C" includes eutectic mixtures of the previously described classes of compounds which are solids at atmospheric pressure but said eutectic mixtures are a liquid at room temperature and atmospheric pressure which have boiling points above about 150° C. Also included in the definition are those solid compounds of the classes previously described which are dissolved in a liquid member of any of the described classes of compounds having boiling points above about 150° C wherein the resultant solution is a liquid at standard conditions of temperature and pressure and have boiling points at atmospheric pressure above about 150° C.

Suitable non-amine-containing catalysts for urethane formation include, for example, organo-metal compounds of tin, zinc, lead, mercury, cadmium, bismuth, cobalt, manganese, antimony, iron and the like such as, for example, metal salts of a carboxylic acid having from about 2 to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

It has previously been stated that the quantity of the non-amine-containing catalyst is in the range of from about 0.2 to about 10%. However, when the liquid modifier compound is a nonester-containing aromatic compound or a halogenated aliphatic compound as described herein, the operable range for the quantity of the catalyst to be employed is from about 0.01 to about 10% and preferably from about 0.05 to about 2% and most preferably from about 0.1 to about 0.5% by weight based upon the combined weights of Components A, B and C.

Suitable polyisocyanates which may be employed as Component B in the compositions of the present invention include, for example, any organic polyisocyanate having 2 or more NCO groups per molecule and no other substituents capable of reacting with the hydroxyl groups of the polyoxyalkylene compound. Suitable such polyisocyanates include, for example, 2,4-toluenedissocyanate, 2,6-toluenediisocyante, hexamethylene diisocyanate, p,p'-diphenylmethanedissocyanate, p-phenylenediisocyanate, hydrogenated methylene diphenyldiisocyanate (e.g. Hylene W) naphthalene diisocyanate, dianisidine diisocyanate, polymethylene polyphenyl-isocynate mixtures of one or more polyisocyanates and the like.

Other organic isocyanates which may suitably be employed and which are to be included in the term organic polyisocyanate include isocyanate terminated prepolymers prepared from the previously mentioned polyols and the above mentioned isocyanates.

The cured compositions of the present invention vary from transparent solids to white or off-white opaque solids, depending upon the particular liquid modifier compound (component C) and/or polyisocyanate (component B) employed to produce such compositions.

Suitable modifier compounds which maybe be employed to produce solid opaque products include, for example,
1. those compounds represented by formula I wherein at least 20% by weight of the compound is derived from units wherein $R_1, R_2 \ldots R_n$ are hydrogen.
2. those compounds represented by formula II wherein the molecular weight is at least about 1500;
3. those compounds represented by formula III wherein the molecular weight is at least about 3000; and
4. those compounds represented by formula IV wherein the molecular weight is at least about 7000 and at least 20% of the molecular weight is derived from units wherein $R_1, R_2, \ldots R_n$ are hydrogen.

Suitable modifier compounds which may be employed to produce transparent solid products include, for example,
1. those compounds represented by formula I wherein less than about 20% by weight of the compound is derived from units wherein $R_1, R_2, \ldots R_n$ are hydrogen;
2. those compounds represented by formula II wherein the molecular weight is greater than about 700 but less than about 1500 and wherein less than 207 of the molecular weight is derived from units wherein $R_1, R_2, \ldots R_n$ are hydrogen;
3. those compounds represented by formula III wherein the molecular weight is greater than about 700 and less than about 3000 and wherein less than about 20% of the molecular weight is derived from units wherein $R_1, R_2, \ldots R_n$ are hydrogen; and
4. those compounds represented by formula IV having a molecular weight from about 1500 to less than about 7000 and wherein less than about 20% of the molecular weight is derived from units wherein $R_1, R_2, \ldots R_n$ are hydrogen.

Rigid polyurethane products can be prepared by rapidly mixing the components of the compositions of the present invention. It is preferred to thoroughly blend together the components represented by A, the polyol, B, the polyisocyanate and C, the liquid modifier compound and then mixing the resultant mixture with Component D, the catalyst. Mechanical dispensing or combination mixing-dispensing devices can be employed by utilizing 2 or more streams of the individual components or mixtures of the components which are introduced into said device.

Other components including inert fillers such as, for example, sand, microballoons, glass fibers, asbestos, aluminum granules, silicon carbide powder and the like, coloring agents, such as pigments and dyes including, for example, chromic oxide, ferric oxide, mixtures thereof and the like may be employed in the compositions of the present invention without detracting from the scope thereof.

The compositions of the present invention rapidly produce solid products which may be demolded, i.e. the articles produced therefrom may be removed from the mold, within about 5 minutes, usually within about 3 minutes and preferably within about 1 minute or less from the time the catalyst is blended into the mixture and do not require the application of external sources of heat to accomplish this, although in some circumstances it may be desirable to post cure, at elevated temperatures, the products in order to develop certain properties. The compositions of the present invention not only can be demolded within 5 minutes and often in less than 2 to 3 minutes, but the cast objects produced therefrom have developed sufficient strength properties to be employed immediately upon cooling to room temperature for their intended purpose. The cast objects are hot or warm to the touch immediately after removing from the mold due to the exotherm generated during the reaction. This is a valuable contribution to the urethane molding art, in that productivity can be increased employing a given quantity of molds.

The choice of the catalyst involves the desired time delay between the catalyst being mixed into the reagents and the liquid mix "instantly" solidifying. For example, if tolylene diisocyanate is used along with a polyol that is the reaction product of glycerine with propylene oxide and having a molecular weight of about 260 plus a polyoxypropylene glycol having a molecular weight of about 4000 as the liquid modifier compound, then the addition of about 1% stannous octoate catalyst will yield a delay or induction time of about 10 seconds before the mixture suddenly "freezes" into a solid. Substitution of dibutyltin dilaurate at the same catalyst level stretches this delay time to about 20 seconds, and phenyl mercuric propionate exhibits a delay time of about 120 seconds before extremely rapid solidification occurs.

The change of isocyanate to a less reactive one, i.e. the substitution of hexamethylene diisocyanate for tolylene diisocyanate, correspondingly increases the delay time before rapid solidification takes place.

Suitable materials from which adequate molds, for casting the compositions of the present invention, may be prepared include polymers such as, for example, polyethylene, polypropylene, their copolymers and the like, polyurethanes, polysiloxane elastomers, Mylar, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactants may not be readily demolded unless the mold is preheated to about 50°–90° C, especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention but are not to be construed as to limiting the scope thereof in any manner.

The following examples 1–10 are illustrative of solid, rigid, opaque and translucent products.

EXAMPLE 1

A. An Example of the Present Invention

In a suitable container where thoroughly blended 30 grams of Voranol CP-260 (the reaction product of glycerine with propylene oxide have a molecular weight of about 260) as the polyol, 30 grams of P-4000, a polyoxypropylene glycol having a molecular weight of about 4000, as the liquid modifier compound and 30 grams of Hylene TM (an 80/20 mixture by weight of the 2,4-and 2,6-isomers of tolylene diisocyanate having an NCO equivalent weight of about 87).

After the above components were well mixed, 1 cc of a liquid dibutyltin dilaurate, commercially available as T-12 catalyst from Metal and Thermit Corp., was rapidly stirred in and the resultant mixture was poured into a polyethylene beaker. Thirty seconds after stirring in the catalyst, the mixture suddenly turned an opaque white color and underwent substantially instantaneous hardening. Sixty seconds after the catalyst was added, a rigid, hard, white, opaque polymer casting was demolded, i.e. removed from the polyethylene beaker, and was found to have a density of 1.055 grams/cc.

B. Comparative Demonstration —Effect of One-Tenth the Amount of Catalyst

The same procedure and composition as in A above was employed except that 0.1 cc of the dibutyltin dilaurate catalyst was employed with the following results.

60 seconds after the catalyst was added, the mixture was stilled a transparent liquid.

120 seconds after the catalyst was added, the mixture was an opaque liquid.

180 seconds after the catalyst was added, the mixture hardened but was too tacky to be demolded.

400 seconds after the catalyst was added, the casting was demolded.

The product was found to be a warped, rigid, white, opaque solid that was filled with gross bubbles or gas cells. This casting had a density of 0.864 grams/cc.

C. Comparative Demonstration of Effect of Omitting the Liquid Modifier

Same procedures as in A above employing 33 grams of the indicated polyol and 33 grams of the polyisocyanate. The mixture suddenly gelled after the catalyst addition; however within the next 4 minute interval, the cast polymer grossly swelled and generated copious quantities of internal gas bubbles and open fissures across the top surface of the casting. The cured polymer mass had a density of 0.56 grams/cc.

EXAMPLES EMPLOYING VARIOUS POLYISOCYANATES

EXAMPLE 2

Same procedure as in Example 1A employing the following components:
33 grams of Voranol CP-260 as the polyol
33 grams of P4000 as the liquid modifier
50 grams of Isonate 143L (dimerized diphenylmethanediisocyanate having an NCO equivalent weight of about 144 and a functionality of about 2.25)
1 cc lead octoate containing 24% Pb.

In less than 15 seconds after catalyst addition, the mixture suddenly solidified into a cream-colored, opaque, hard, rigid polymer which was demoldable within 40 seconds.

EXAMPLE 3

Same procedure as in Example 1A employing the following components:
30 grams of Voranol CP-260
30 grams of P-3000 (a polyoxypropylene glycol having an average molecular weight of about 3000) as the liquid modifier
45 grams of Hylene W (hydrogenated methylene diphenyldiisocyanate having an NCO equivalent weight of about 132 and a functionality of about 2).
1 cc of lead octoate having 24% Pb.

The mixture suddenly turned into an opaque, dense, hard solid within about 15 seconds and could be demolded within about 40 seconds.

EXAMPLE 4

Same procedure as in Example 1A employing the following components.
30 grams of Voranol CP-260
30 grams of P-3000
32 grams of Takenate 500 (Xylylene diisocyanate having an NCO equivalent weight of about 94 and an average functionality of about 2).
1 cc of lead octoate (24% Pb).

The mixture suddenly turned into an opaque, while solid within about 30 seconds and could be demolded within about 50 seconds.

EXAMPLES EMPLOYING VARIOUS POLYOLS

EXAMPLE 5

Same procedure as in Example 1A employing the following components.
26 grams of Voranol CP450 (reaction product of glycerine with propylene oxide having a molecular weight of about 450).
15 grams of P-4000
16 grams of Hylene TM
1 cc of lead octoate (24% Pb)

The mixture rapidly set to produce a rigid, hard, opaque, white, solid, casting within about 25 seconds which could be demolded within about 40 seconds.

EXAMPLE 6

Same procedure as in Example 1A employing the following components.
30 grams of the reaction product of glycerine with ethylene oxide in a molar ratio of 1:3 and having a hydroxyl equivalent weight of about 75.9.
30 grams P-4000

30 grams Hylene TM
1 cc lead octoate (24% Pb)

The mixture suddenly set into a hard, rigid, white, opaque solid product within about 30 seconds which could be demolded within about 50 seconds.

COMPARATIVE EXAMPLE 6A

To demonstrate that initiator compounds having a functionality of 3 but which not have been reacted with an alkylene oxide cannot be employed as the polyol to produce the compositions of the present invention, Example 6 was duplicated by substituting glycerine and again substituting trimethylol propane as the polyol component i.e. as a replacement for the glycerine-ethylene oxide reaction product.

In both instances, the formulations did not demonstrate an "instant set" capability and they could not be demolded within 10 minutes after casting. After several hours, these castings were found to be low strength foams.

EXAMPLES OF VARIOUS LIQUID POLYOXYALKYLENE MODIFIER COMPOUNDS

EXAMPLE 7

Same procedure as in Example 1A employing the following composition.
33 grams of Voranol CP-260
33 grams of the reaction product of allyl alcohol with a 50—50 wt. % mixture of propylene oxide and ethylene oxide having a modular weight of about 1800 and finally end capped with a methyl group, as the liquid modifier.
33 grams of Hylene TM
1 cc of lead octoate (24% Pb).

The mixture set into a rigid, hard, white, opaque solid having a density of about 1.12 grams/cc within about 20 seconds which could be demolded within about 40 seconds.

EXAMPLE 8

Same procedure as in Example 1A employing the following composition.
33 grams of Voranol CP-260
33 grams of the adduct of propylene oxide onto butanol and having a molecular weight of about 2000. 33 grams of Hylene TM
1 cc of lead octoate (24% Pb).

The mixture set into a rigid, white, opaque, solid product within about 20 seconds which could be demolded within about 40 seconds.

EXAMPLE 9

Same procedure as in Example 1A employing the following composition.
30 grams of Voranol CP-260
32 grams of the adduct of 80-20 mole percent mixture or propylene oxide and ethylene oxide onto a glycerine-propylene oxide adduct having a molecular weight of about 260, the molecular weight of the resultant product being about 10,000.
30 grams of Hylene TM
1 cc of lead octoate (24% Pb)

The mixture rapidly set into an opaque, white, hard, solid product within about 20 seconds and could be demolded within about 40 seconds.

EXAMPLE 10

Same procedure as in Example 1A employing the following composition.
30 grams of Voranol CP-260
30 grams of propylene glycol initiated polyepichlorohydrin having an average molecular weight of about 2000.
30 grams Hylene TM
1 cc of lead octoate (24% Pb)

The composition rapidly set into a hard, opaque, rigid, solid product within about 20 seconds which was readily demoldable within about 40 seconds.

The following examples 11–19 are illustrative of solid, rigid, transparent products.

EXAMPLE 11

Same procedure as in Example 1A employing the following composition.
30 grams of Voranol CP-260
30 grams of Voranol CP-4701 (the reaction product of glycerine with proplyene oxide end-capped with ethylene oxide and having an average molecular weight of about 4700)
30 grams of Hylene TM
1 cc lead octoate The mixture set into a rigid, transparent, solid product within about 20 seconds and could be demolded within about 30 seconds. The casting had a density of 1.1 grams/cc.

EXAMPLES OF VARIOUS POLYISOCYANATES, POLYOLS AND MODIFIER COMPOUNDS

EXAMPLE 12

Same procedure as in Example 1A employing the following composition.
33 grams of Voranol CP-260
33 grams of Voranol CP-3000 (glycerine initiated polyoxypropylene glycol having an average molecular weight of about 3000)
50 grams Isonate 143L
1 cc T-9 catalyst (stannous octoate commercially available from Metal and Thermit Corp.).

The mixture rapidly set into a rigid, transparent, solid within about 15 seconds and could be demolded within about 30 seconds.

EXAMPLE 13

Same procedure as in Example 1A employing the following composition.
30 grams of Voranol CP-260
30 grams of Voranol CP-1500 (glycerine initiated polyoxypropylene glycol having an average molecular weight of about 1500)
30 grams of Hylene TM
1 cc of T-9 catalyst The mixture instantly set into a transparent, solid product within about 40 seconds and could be demolded within about 60 seconds.

COMPARATIVE EXAMPLE 13-A

Same procedure as in Example 1A employing the following composition.
30 grams of Voranol CP-260
30 grams of Voranol CP-700 (glycerine initiated polyoxypropyleneglycol having an average molecular weight of about 700)
30 grams of Hylene TM
1 cc T-9 catalyst The mixture demonstrated instant set characteristics but the product swelled and cracked.

EXAMPLE 14

Same procedure as in Example 1A employing the following composition.

30 grams of Voranol CP-260

31 grams of a triol prepared by reacting glycerine with a mixture of propylene oxide and ethylene oxide having an average molecular weight of about 4100 and about 16 weight percent ethylene oxide).

30 grams Hylene TM 1 cc lead octoate (24% lead)

The mixture instantly set within about 30 seconds and the rigid, solid, clear casting was demolded within about 50 seconds.

EXAMPLE 15

Same procedure as in Example 1A employing the following composition.

30 grams of the reaction product of glycerine with propylene oxide in a molar ratio of about 1:3 respectively.

30 grams Voranol CP-4701 (glycerine initiated polyoxypropylene glycol end-capped with ethylene oxide)

45 grams Hylene W 1 cc lead octoate (24% Pb)

At the end of 180 seconds the mixture was still liquid; at 195 seconds the mixture began to gel rapidly, and at 210 seconds the casting was a rigid transparent tack-free solid.

When the same formulation was catalyzed by 5 cc of 24% Pb octoate, the solidification was not greatly accelerated, e.g. the mix was still liquid at 120 seconds, gelling occurred rapidly at 135 seconds, and the product was a transparent rigid solid at 150 seconds after catalyst addition.

EXAMPLE 16

Same procedure as in Example 1A employing the following composition.

30 grams of the reaction product of glycerine with propylene oxide at a molar ratio of 1:3 respectively.

30 grams of Voranol CP-4701

30 grams of hexamethylene diisocyanate 1 cc of lead octoate (24% Pb)

The mixture set into a transparent, rigid, solid within about 70 seconds and could be demolded within about 90 seconds.

EXAMPLE 17

Same procedure as in Example 1A employinng the following composition.

26 grams of Voranol CP-450 (glycerine initiated polyoxypropylene glycol having an average molecular weight of about 450).

15 grams of Voranol CP-4701

16 grams of xylylene diisocyanate 0.7 cc of lead octoate (24% Pb)

The mixture instantly set into a transparent, rigid, solid product within about 30 seconds which could be demolded within about 50 seconds.

EXAMPLE 18

Same procedure as in Example 1A employing the following composition.

33 grams of Voranol CP-260

33 grams of a butanol initiated polyoxypropylene glycol having an average molecular weight of about 1000.

33 grams of Hylene TM 1 cc of lead octoate catalyst

The mixture instantly set into a transparent, rigid, dense product within about 20 seconds and could be demolded within about 35 seconds.

EXAMPLE 19

Same procedure as in Example 1A employing the following composition.

35 grams of Voranol CP-260

30 grams of a polyoxypropylene glycol having an average molecular weight of about 1000.

35 grams of Hylene TM 1 cc of lead octoate (24% Pb)

The mixture instantly set into a transparent, rigid, dense product within about 10 seconds and could be demolded within about 30 seconds.

EXAMPLE 20

Same procedure as in Example 1A employing the following component:

35 grams of Voranol CP260

30 grams of distilled tall oil 35 grams of Hylene TM 1 cc of stannous octoate (T-9)

About 30 seconds after catalyst addition, the liquid reactants suddenly solidified into an opaque, off-white, rigid, solid having a density of 1.15 grams/cc.

EXAMPLE 21

33 grams of Voranol CP-260

30 grams of distilled Tall oil 45 grams of PAPI (polymethylenepolyphenylisocyanate having an average functionality of about 2.6 and an NCO equivalent weight of about 133)

1 cc T-9 catalyst

About 35 seconds after catalyst addition, the mixture suddenly "froze" into a rigid, solid material having a density of 1.04 grams/cc.

EXAMPLE 22

Same procedure as in Example 1A employing the following components:

30 grams of the reaction product of pentaerythritol with propylene oxide in a molar ratio of 1 to 5 respectively.

30 grams of linseed oil 30 grams of toluene diisocyanate 1 cc of T-9 catalyst

The mixture suddenly set into a dense, solid product.

EXAMPLE 23

Same procedure as in Example 1A employing the following components:

33 grams of the reaction product of pentaerythritol with propylene oxide in a molar ratio of 1 to 5 respectively.

30 grams of distilled tall oil 33 grams of toluene diisocyanate 1 cc of T-9 catalyst The mixture solidified within about 30 seconds after catalyst addition and was demolded after about 45 seconds after catalyst addition. The rigid, solid casting had a density of 1.11 grams/cc.

EXAMPLE 24

Same procedure as in Example 1A employing the following components:
  30 grams of Voranol CP-260
  20 grams of oleic acid
  46 grams of PAPI (polymethylene polyphenylisocyanate)
  1 cc of T-9 catalyst About 35 seconds after catalyst addition, the mixture suddenly set into a rigid, light brown casting which had a density of about 1.04 grams/cc.

EXAMPLE 25

Same procedure as in Example 1A employing the following components:
  30 grams of the reaction product of glycerine with propylene oxide to a molecular weight of about 260.
  20 grams of linseed oil
  46 grams of PAPI
  1 cc of T-9 catalyst The mixture suddenly set into a rigid, khaki-colored, opaque, solid within about 25 seconds after catalyst addition. The casting was demolded within about 1 minute after catalyst addition and had a density of 1.12 grams/cc.

EXAMPLE 26

Same procedure as in Example 1A employing the following components:
  30 grams of the reaction product of glycerine with propylene oxide to a molecular weight of about 260.
  20 grams of castor oil
  46 grams of PAPI
  1 cc of T-9 catalyst About 25 seconds after catalyst addition, the mixture set into a rigid, solid which was demolded in about 1 minute after catalyst addition. The casting had a density of 1.12 grams/cc.

EXAMPLE 27

Same procedure as in Example 1A employing the following components:
  30 grams of Voranol CP-260
  30 grams of Hylene TM
  30 grams of 1,2,3,4-tetrahydronaphthalene
  1 cc of lead octoate (24% Pb)

About 15 seconds after catalyst addition, the mixture suddenly set into a rigid, clear, transparent, solid.

EXAMPLE 28

Same procedure as in Example 1A employing the following components:
  30 grams of the reaction product of glycerine with propylene oxide at a mole ratio of about 1 to 3 respectively and having a molecular weight of about 260.
  45 grams of PAPI
  20 grams acetophenone
  1 cc T-9 catalyst The mixture was cast into a shallow Mylar tray and suddenly solidified within about 20 seconds after catalyst addition and the cast sheet was removed about 35 seconds later. The product had the following properties:
  Density > 1 gram/cc
  Shore D Hardness about 92

EXAMPLE 29

Same procedure as in Example 1A employing the following components:
  30 grams reaction product of glycerine with propylene oxide to a molecular weight of about 260.
  30 grams of 1,2,4-trichlorobenzene
  30 grams toluenediisocyanate
  1 cc lead octoate About 15 seconds after catalyst addition, the mixture suddenly set into a rigid, transparent solid.

EXAMPLE 30

Same procedure as in Example 1A employing the following components:
  35 grams of the reaction product of glycerine with propylene oxide to a molecular weight of about 260.
  20 grams of 1,2,3,4-tetrahydronaphthalene
  10 grams of 1,2,4-trichlorobenzene
  35 grams of toluene diisocyanate
  0.3 cc of lead octoate The mixture suddenly set into a rigid, transparent solid.

EXAMPLE 31

Same procedure as in Example 1A employing the following components:
  30 grams of the reaction product of glycerine with propylene oxide to a molecular weight of about 260.
  30 grams of α-chloronaphthalene
  30 grams of toluenediisocyanate
  0.4 cc of lead octoate About 20 seconds after catalyst addition, the mixture suddenly set into a rigid, transparent solid.

EXAMPLE 32

A. Same procedure as in Example 1A employing the following components:
  30 grams of the reaction product of glycerine with propylene oxide to a molecular weight of about 260.
  30 grams of 1,2,4-triethylbenzene (b.p. approx. 215° C)
  30 grams of toluenediisocyanate
  0.4 cc of lead octoate About 30 seconds after catalyst addition, the mixture suddenly set into a rigid, opaque solid. About 45 seconds after catalyst addition, the casting was demolded and had a density of 1.12 grams/cc.

B. Comparative Example —Use of Modifier Compound With a Boiling Point Below About 150° C Same procedure as in Example 1A employing the following components:
  30 grams of the reaction product of glycerine with propylene oxide to a molecular weight of about 260.
  30 grams of ethylbenzene (b.p. approx. 136° C)
  30 grams of toluene diisocyanate
  0.4 cc of lead octoate About 20 seconds after catalyst addition, the mixture suddenly swelled with gross bubble formation to yield an expanded rigid casting having an apparent density of 0.67 grams/cc.

EXAMPLE 33

Same procedure as in Example 1-A employing the following composition:
  30 grams of the reaction product of glycerine with about 3 moles of ethylene oxide per mole of glycerine.
  32 grams xylylene diisocyanate
  30 grams tris(2-chloroethyl)phosphate 0.5 cc lead octoate The mixture instantaneously set within about 15 seconds after catalyst addition and was demolded within about 30 seconds after catalyst addition thereby producing a clear, transpaent, rigid, non-brittle solid casting having a density of about 1.25 grams/cc.

EXAMPLE 34

Same procedure as in Example 1-A employing the following composition:

30 grams of the reaction product of glycerine with 3 moles of propylene oxide per mole of glycerine having a hydroxyl equivalent weight of about 87.
46 grams PAPI (polymethylene polyphenylisocyanate)
20 grams tri-n-butylphosphate
1 cc stannous octoate catalyst The mixture suddenly solidified within about 20 seconds after catalyst addition and the resultant casting was demolded within about 30 seconds after catalyst addition. The product was a tough, dark colored (transparent in very thin sections) solid, rigid product having a density of 1.15 grams/cc.

EXAMPLE 35

Same procedure as in Example 1A employing the following composition.
30 grams Voranol CP-260
30 grams toluenediisocyanate
30 grams tricresyl phosphate
0.5 cc lead octoate (24% lead)

The mixture was cast as a sheet and within about 10 seconds after catalyst addition, suddenly solidified into a tough, colorless, transparent rigid solid.

EXAMPLE 36

Same procedure as in Example 1A employing the following composition:
30 grams of the reaction product of glycerine with propylene oxide in a molar ratio of about 1:3 having a hydroxyl equivalent weight of 87.
30 grams of toluene diisocyanate
30 grams of triethylphosphate
0.5 cc. of lead octoate The mixture was cast as a sheet which instantly set into a transparent, relatively soft sheet having an eleongation less than about 100 percent. The relative softness of this product is believed to have been derived from a side effect of the triethylphosphate also functioning as a plasticizer at this concentration.

EXAMPLE 37

Same procedure as in Example 1A employing the following composition.
30 grams of Voranol CP-260
30 grams of toluene diisocyanate
30 grams of tributylphosphite
0.5 cc of lead octoate The mixture suddenly solidified into an opaque, white, rigid casting within about 10 seconds after catalyst addition.

EXAMPLE 38

Same procedure as in Example 1A employing the following composition.
30 grams of Voranol CP-260
30 grams of toluene diisocyanate
30 grams of bis(2-bromopropyl)2-bromopropane phosphonate
1 cc of stannous octoate (T-9)

The mixture suddenly solidified into a transparent, solid, rigid casting within about 20 seconds after catalyst addition and was demolded within about 40 seconds after catalyst addition.

EXAMPLE 39

Same procedure as in Example 1A employing the following composition.
45 grams of Voranol CP-260 30 grams of tris(2-chloroethyl)phosphate
75 grams of ISONATE 143L ( a diphenylmethane diisocyanate which has been dimerized with phosphoric acid and having an NCO equivalent weight of about 144 and an average functionality of about 2.25)
1 cc of dibutyl tin dilaurate The above mixture was cast onto a Mylar sheet and suddenly solidified within about 20 seconds after catalyst addition and within about 40 seconds after catalyst addition a rigid, yellow-brown, transparent sheet was removed from the casting surface.

Test specimens cut from the above prepared sheet had the followig properties.

| tensile strength (ultimate) | 7500 psi |
| % elongation | 10 |
| Hardness, Shore D | 90 |

EXAMPLE 40

Same procedure as in Example 1A exploying the following composition:
30 grams of the reaction product of glycerine with ethylene oxide in a molar ratio of 1:3 having a hydroxyl weight of 75.9.
30 grams of propylene carbonate
30 grams of toluene diisocyanate (80% 2,4-and 20% 2,6-isomer mixture)
0.5 cc of lead octoate The mixture instantly set within about 10 seconds after catalyst addition into rigid, transparent casting having a density greater than 1 gram/cc.

EXAMPLE 41

Same procedure as in Example 1-A employing the following composition:
30 grams of Voranol CP-260
20 grams of bis(2-chloroethyl)carbonate
20 grams of toluene diisocyanate
0.5 cc of stannous octoate The mixture suddenly solidified within about 10 seconds after catalyst addition which was demolded within about 20 seconds after catalyst addition thereby producing a transparent, rigid dense casting.

EXAMPLE 42

Same procedure as in Example 1-A employing the following composition:
45 grams of Voranol CP-260
30 grams of propylene carbonate
69 grams of polymethylene polyphenylisocyanate
1 cc of stannous octoate The above mixture was cast onto a Mylar sheet which instantly set within about 20 seconds after catalyst addition.

The dark brown, rigid, transparent product was removed from the Mylar casting surface within about 45 seconds after catalyst addition. The product was found to possess the following properties.

| | |
|---|---|
| tensile strength | 4940 psi |
| elongation | 12% |
| Hardness, Shore D | 87 |

EXAMPLE 43

Same procedure as in Example 1-A employing the following composition:

30 grams of the reaction product of glycerine with ethylene oxide in a molar ratio of 1:3 respectively having a hydroxyl equivalent weight of about 75.9.

32 grams of xylylene diisocyanate 30 grams of the cyclic tetramer of ethylene oxide 0.5 cc of lead octoate (24% Pb)

The mixture suddenly solidified within about 15 seconds after catalyst addition and the casting was demolded within about 25 seconds after catalyst addition. The casting was a transparent rigid solid which had a density of 1.2 grams/cc.

EXAMPLE 44

Same procedure as in Example 1-A employing the following composition 30 grams of Voranol CP-260

30 grams of toluene diisocyanate 30 grams of a mixture of cyclic polyethers of propylene oxide containing pentamer and higher homologs.

1 cc of lead octoate.

The mixture suddenly solidified within about 12 seconds after catalyst addition and the solid product was demolded within about 30 seconds after catalyst addition yielding a translucent, rigid off-white casting having a density of 1.15 grams/cc.

EXAMPLE 45

Same procedure as in Example 1-A emloying the following composition.

30 grams of the reaction product of pentaerythritol with propylene oxide in a molar ratio of about 1:5 respectively and having a molecular weight of about 415–430.

46 grams of PAPI (polymethylene polyphenylisocyanate)

30 grams of the cyclic tetramer of propylene oxide.

1 cc of stannous octoate (T-9).

The composition suddenly set within about 25 seconds after catalyst addition to yield a dark, rigid casting having a density of 1.09 grams/cc which was readily demolded within 40 seconds after catalyst addition.

EXAMPLE 46

Same procedure as in Example 1-A employing the following composition:

32 grams of Voranol CP-260

32 grams of toluene diisocyanate (80/20 mixture of 2,4-and 2,6-isomers)

3 grams of "Chlorowax" No. 40 (a liquid chlorinated paraffin having a specific gravity of 1.15, a viscosity of 25 poises at 25° C, manufactured and sold by Diamond-Shamrock Chemicals)

0.5 cc of lead octoate

The mass suddenly set, within about 10 seconds after catalyst addition, into rigid casting having a density of 1.2 grams/cc and had no visual indications of cracks, distortions or bubble formation.

EXAMPLE 47

Same procedure as in Example 1-A employing the following composition:

30 grams of Voranol CP-260

25 grams of 1,2,3-trichloropropane 45 grams of PAPI (a polymethylene polyphenyl isocyanate having an average functionality of about 2.6-2.8 and an NCO equivalent weight of about 134).

1 cc of stannous octoate (T-9 commercially available from M & T Chemicals).

The mixture suddenly solidified within about 30 seconds after catalyst addition and 15 seconds later was demolded. The dark, dense, rigid casting had a density of 1.2 g/cc.

EXAMPLE 48

Same procedure as in Example 1-A employing the following composition:

30 grams of Voranol CP-260

30 grams of toluene diisocyanate (80/20 mixture of 2,4- and 2,6-isomers)

0.5 cc of lead octoate (24% lead)

20 grams tetrabromoethane

The blend suddenly solidified within about 15 seconds after catalyst addition and was demolded within about 30 seconds after catalyst addition thereby producing a dense, rigid, bubble-free casting having a density of 1.58grams/cc.

EXAMPLE 49

Same procedure as in Example 1-A employing the following composition.

37 grams of Voranol CP-260

37 grams of toluene diisocyanate (80/20 blend of 2,4-and 2,6-isomers)

3 grams of tetrabromoethane 0.5 cc of lead octoate (24% lead)

The mixture suddenly set within about 15 seconds after catalyst addition to yield a dense rigid, bubble-free casting.

EXAMPLE 50

Same procedure as in Example 1-A employing the following composition.

30 grams of Voranol CP-260

30 grams of TDI (80/20 mixture of 2,4- and 2,6-isomers)

25 grams of 1,10-dibromodecane 0.5 cc of lead octoate

The mixture suddenly solidified within about 15 seconds after catalyst addition and was demolded within about 30 seconds after catalyst addition to provide a dense, rigid, bubble- and crack-free casting having a density of 1.35 grams/cc.

EXAMPLE 51

Same procedure as in Example 1-A employing the following composition.

30 grams of Voranol CP-260

30 grams of toluene diisocyanate (80/20 mixture of 2,4- and 2,6-isomers)

30 grams of bromoform 0.5 cc of lead octoate

EXAMPLE 52

Same procedure as in Example 1-A employing the following composition.
30 grams of Voranol CP-260
30 grams of hexachlorobutadiene
30 grams of toluene diisocyanate (80/20 mixture of 2,4- and 2,6-isomers)
1 cc of lead octoate The mixture solidified to within 15 seconds after catalyst addition to provide a dense, rigid, bubble-free casting.

EXAMPLE 53

Same procedure as in Example 1-A employing the following composition.
32 grams of Voranol CP-260
32 grams of toluenediisocyanate (80/20 mixture of 2,4- and 2,6-isomers)
4 grams of polyepichlorohydrin diol* having a molecular weight of about 2000
0.5 cc of lead octoate

* The polyepichlorohydrin diol was prepared by slowly adding over a period of about 1 hour 17 pounds of epichlorohydrin to a mixture containing 15 pounds of benzene, 400 grams of 48% aqueous fluoroboric acid and 503 grams of water. The epichlorohydrin addition was conducted at 47° C and digested for about 30 minutes at 47° C; 40 pounds of benzene was added and 155 pounds of epichlorohydrin was added over a 5 ¼ hour period and digested at 47° for about 30 minutes. The water was removed via a water-benzene azeotrope at 90° C for 2 hours after neutralizing the catalyst with 5 ¼ pounds of 4% aqueous NaOH. The benzene-polyepichlorohydrin mixture was filtered and the benzene removed at 90° C at reduced pressure in about 2 hours. The product contained 1.72% OH by analysis.

This mixture rapidly set into a dense, rigid casting having a density of 1.2 grams/cc.

EXAMPLE 54

Same procedure as in Example 1-A employing the following composition:
40 grams of Voranol CP-260
40 grams of toluene diisocyanate (80/20 mixture of 2,4- and 2,6-isomers)
40 grams of "Chlorowax" No. 40
0.5 cc of lead octoate The mixture rapidly solidified thereby forming a dense, rigid casting having a density greater than 1 gram/cc.

EXAMPLE 55 (COMPARATIVE)

This comparative example illustrates the inoperability of halogenated aliphatic compounds having a boiling point below 150° C. Same procedure as in Example 1-A employing the following composition:
30 grams of Voranol CP-260
30 grams of perchloroethylene (boiling point = 121° C)
30 grams of toluenediisocyanate (80/20 mixture of 2,4- and 2,6-isomers)
0.8 cc of lead octoate The above mixture suddenly expanded within about 15 seconds after catalyst addition into a non-uniform cellular rigid mass having a density of 0.48 gram/cc.

EXAMPLE 56

Same procedure as in Example 1-A employing the following composition:
30 grams of Voranol CP-260
30 grams of toluene diisocyanate (80/20 mixture of 2,4- and 2,6-isomers)
40 grams of α-chloronaphthalene
0.05 cc of lead octoate (24% lead)

The mixture suddenly solidified about 65 seconds after catalyst addition to yield a transparent rigid polymer which was demolded about 90 seconds after catalyst addition. The density of this casting was found to be 1.17 grams/cc.

EXAMPLE 57

Same procedure as in Example 1-A employing the following composition:
30 grams of Voranol CP-260
30 grams of toluene diisocyanate (80/20 mixture)
15 grams of Voranol CP-1500
15 grams of triethylbenzene
0.05 cc of lead octoate (24% lead)

This blend was cast into a polyethylene mold and the blend suddenly solidified about 50 seconds after catalyst addition and was removed from the mold 75 seconds after catalyst addition. This transparent rigid casting was found to have a density of 1.16grams/cc.

EXAMPLE 58

Same procedure as in Example 1-A employing the following composition:
30 grams of Voranol RS-350, a commercially available 8-functional polyether polyol having an OH equivalent weight of about
15 grams of Voranol CP-260
30 grams of toluene diisocyanate (80/20 mixture of 2,4- and 2,6-isomer)
30 grams of triethylbenezene
0.1 cc of lead octoate This blend solidified into a dense opaque, rigid casting about 35 seconds after catalyst addition; the casting was removed from the mold 20 seconds later to yield an opaque polymer having a density of 1.082/cc.

EXAMPLE 59

Same procedure as in Example 1-A employing the following composition:
60 grams of Voranol RS-350
30 grams of toluene diisocyanate (80/20 mixture)
30 grams of trichlorobenzene
1 cc of lead octoate (24% lead)

This blend was cast into a polyethylene mold and was found to solidify about 15 seconds after catalyst addition; the casting was removed from the mold 25 seconds after catalyst addition.

EXAMPLE 60

Same procedure as in Example 1-A employing the following composition:
130 grams of Voranol CP-260
130 grams of toluenediisocyanate (80/20mixture)
20 grams of "Chlorowax No. 40"
0.5 cc of lead octoate (24% lead)

This blend was cast into a Mylar tray and was found to solidify and be removed from the Mylar tray as a dense rigid sheet in less than 60 seconds after catalyst addition. Appropriate tensile bars were cut from this cast resin and were found to exhibit an ultimate tensile of 15,600psi at 10% elongation.

EXAMPLE 61

Same procedure as in Example 1-A employing the following composition:
30 grams of Voranol CP-260
15 grams of toluenediisocyanate (80/20 mixture)

25 grams of hydrogenated methylene diphenyl isocyanate (Hylene W)
10 grams of "Chlorowax No. 40"
1 cc of lead octoate (24% lead)

This blend was cast and was found to suddenly solidify 20 seconds after catalyst addition. The rigid casting was demolded 40 seconds after catalyst addition and was found to have a density of 1.10 grams/cc.

EXAMPLE 62

Same procedure as in Example 1-A employing the following composition:
300 grams of the reaction product of glycerine with 3 moles of propylene oxide per mole of glycerine.
400 grams of a prepolymer prepared from the reaction product of 3 moles of propylene oxide per mole of glycerine and toluene diisocyanate, said prepolymer containing 31% NCO.
300 grams of trichlorobenzene
1 cc lead octoate (24% Pb)

This liquid blend was cast between 2 parallel sheets of polyethylene; the liquid mix was found to solidify in less than 1 minute after catalyst addition and the cast product was removed from the mold in less than 2 minutes after catalyst addition. This casting was found to be transparent and bubble-free.

EXAMPLE 63

Same procedure as in Example 1-A employing the following composition:
60 grams of Voranol RS-350
30 grams of toluene diisocyanate (80/20 mixture)
20 grams of 3-methylsulfolane
1 cc of lead octoate (24% Pb)

This liquid blend solidified in less than 30 seconds and was demolded about 30 seconds later to yield a hard, transparent, rigid casting.

EXAMPLE 64

A. Example of the present invention
Same procedure as in Example 1-A employing the following composition:
45 grams of Voranol CP-260 (OH equivalent wt. = approx. 87)
45 grams of Hylene TM
30 grams of Voranol CP-4701
0.4 cc of lead octoate (24%Pb)

This blend was cast into a Mylar tray and was found to solidify into a transparent sheet in less than a minute after catalyst addition. This sheet was removed from the mold in less than 2 minutes after catalyst addition and had physical properties as indicated in the table below.

B. Comparative
Same procedure as in Example B 1-A employing the following composition:
105 grams of Voranol CP-700 (OH equivalent wt. = approx. 232)
30 grams of Hylene TM
40 grams of Voranol CP-4701
1 cc of lead octoate (24% Pb)

This blend was also cast into a Mylar tray and was found to solidify 35 seconds after catalyst addition. The weak, rubbery transparent cast sheet was removed from the mold about 20 seconds after catalyst addition and had properties as indicated in the table below, which shows that polyols employed as component A having an OH equivalent weight above 230 do not produce the products of the present invention i.e. the % elongation was greater than 80%.

| Polymer | Ultimate Tensile | Elongation | Hardness |
|---|---|---|---|
| A (present invention) | 6540 psi | 20% | 85 Shore D |
| B (comparative) | 104 psi | 92% | 45 Shore A |

The following examples demonstrates the use of by-product streams containing mixtures of aromatic-containing compounds.

EXAMPLE 65

Same procedure as in Example 1-A employing the following composition:
30 grams of the reaction product of glycerine with propylene oxide in a molar ratio of 1:3 respectively, said product having a molecular weight of about 260.
30 grams of a mixed stream of aromatic-containing compounds as the residue stream obtained from the manufacture of ethyl benzene and having typical composition by weight as follows:
3% triethylbenzene
11% tetraethylbenzene
1% pentaethylbenzene
3% bis-ethylphenylethane
8% ethylphenyl-phenylethane
13% 1,1-diphenylethane
61% higher boiling components
30 grams of toluenediisocyanate (80/20 mixture of 2,4- and 2,6-isomers)
1 cc of stannous octoate T-9 (M & T Chemicals)

The blend was cast into a polyethylene mold and suddenly solidified within 20 seconds after catalyst addition. The rigid, dense casting was demolded within 60 seconds after catalyst addition.

EXAMPLE 66

A. Present Invention
Same procedure as in Example 1-A employing the following composition:
60 grams of Voranol RS-350
30 grams of toluene diisocyanate 60 grams of Voranol cp-3000
0.5 cc of lead octoate (24% Pb)

The mixture was cast as a sheet in a Mylar tray and allowed to cure overnight at room temperature.

B. Prior Art Comparison
Same procedure as in Example 1-A employing the following composition:
60 grams of Voranol RS-350
30 grams of toluenediisocyanate
60 grams of diotylphthalate
0.5 cc of lead octoate (24% Pb)

The mixture was cast as a sheet in a Mylar tray and allowed to cure overnight at room temperature.

C. After curing overnight, each of the panels from A and B above were sprayed with Krylon black enamel in 2 inch wide stripes. After 2 hours of drying at room temperature, the paint coating was found to be poorly attached to panel B, an example of the prior art, but was well attached to panel A, an example of the present invention.

D. Another portion of each of panels A and B were sprayed with 2 inch wide stripes of Illinois Bronze-Powder and Paint Co.'s Flat Black No. 607. The paint dried within an hour on Panel A, the present invention, whereas on Panel B, the prior art, the panel was still tacky after 6 hours.

After 72 hours of drying at room temperature, a fingernail scratch removed paint from panel B, the prior art panel; whereas panel A, the present invention, resisted removal of paint by fingernail scratching. A finger pressure dry rag wipe also removed paint from panel B, the prior art; whereas no paint was removed by this test from panel A, the present invention.

Some amine type catalysts will catalyze the urethane reaction to produce instant set products, but the resultant products are of low density, i.e. less than about 1 gram/cc and contain many bubbles which adversely affect the physical properties. This inoperability of the amine type catalysts insofar as the present invention is concerned is demonstrated by the following comparative Example 67.

EXAMPLE 67 (COMPARATIVE)

A. Same procedure as Example 1-A employing the following composition.
30 grams of Voranol CP-260
30 grams of Voranol CP-3000
30 grams of Hylene TM
1 cc of a 33% solution of diethylenetriamine in dipropyleneglycol.

The mixture slowly set within about 90 seconds to produce an opaque, tacky, rubbery polymer containing many bubbles and having a density of 0.6 grams/cc. The casting could be demolded with difficulty within about 120 seconds.

B. Same procedure as in Example 1A employing the following composition:
30 grams of Voranol CP-260
30 grams of Voranol CP-3000
30 grams of Hylene TM
2 cc of triethylamine The mixture slowly set within about 60 seconds which could be demolded with difficulty within about 90 seconds. The product was an opaque, rigid solid which had many bubbles and a density of about 0.63 grams/cc.

C. Same procedure as in Example 1A employing the following composition.
30 grams of Voranol CP-260.
30 grams of Voranol CP-3000
30 grams of Hylene TM
2 cc of N,N,N',N'-tetramethyl-1,3-butane diamine.

The mixture slowly set within about 120 seconds to produce an opaque, tacky, foam-like product which had a density of 0.51 gram/cc.

The following example demonstrates the superior solvent resistance of the present invention as compared to the products of U.S. Pat. No. 3,378,511.

EXAMPLE 68 (COMPARATIVE)

Three rigid castings were prepared by the procedure of Example 1-A employing the following formulations.

Formulation A (Present Invention)

30 grams of the reaction product of glycerine with propylene oxide in a molar ratio of about 1:3 respectively
30 grams of toluene diisocyanate
30 grams of Voranol P-4000
1 cc of lead octoate (24% Pb)

Formulation B (Present Invention)

30 grams of the reaction product of glycerine and propylene oxide at a molar ratio of about 1:3 respectively
30 grams of toluene diisocyanate
20 grams of trichlorobenzene
0.2 cc of lead octate Formulation C (Prior Art Teachings — U.S. Pat. No. 3,378,511)

30 grams of the reaction product of glycerine and propylene oxide in a molar ratio of about 1:3 respectively
30 grams of toluene diisocyanate
30 grams of diisodecyl phthalate
1 cc of lead octoate (24% Pb)

Each of the above formulations A, B and C suddenly solidified into a dense, rigid casting within about 30 seconds after catalyst addition and were demolded within about 60 seconds.

Several ¼inches × ¾ × 1 ¾inches specimens were cut from the castings of Formulations A, B, and C and immersed in various solvents at room temperature. Periodic observations were taken to ascertain the condition of each specimen after exposure to the solvents. The solvents and observations are given in the following Table.

OBSERVATION

| SOLVENT | Formulation A | Formulation B | Formulation C |
| --- | --- | --- | --- |
| Acetone | no change after 1 hr. exposure | no change after 1 hr. exposure | severe cracks developed after 1 hr. exposure |
| Tetrahydrofuran | slight trace of cracking | not tested | severe cracking and swelling after 1 hr. exposure |
| Methylene chloride | slight trace of cracking after 1 hr. exposure | no change after 1 hr. exposure | severe cracking with particles separating from specimen after 1 hr. exposure. |
| Ethylene dichloride | intact after 36 hours of exposure | no change after 5 hrs. of exposure | developed severe cracks after 5 hrs. of exp., total disintegration into discrete particles after 36 hrs. exp. |
| Ethyl Acetate | no change after 36 hrs. of exposure | no change after 7 hrs. of exposure | slight decrepitation into discrete parti- |

OBSERVATION-continued

| SOLVENT | Formulation A | Formulation B | Formulation C |
|---|---|---|---|
| Methylisobutyl ketone | no change after 36 hrs. of exposure | not tested | cles after 7 hrs. and total disintegration after 36 hrs. exposure. slight swelling after 36 hrs. of exposure. |

The preceding example clearly demonstrates the superior solvent resistance of the composition of the present invention, formulation A and B, as compared to the prior art, U.S. Pat. No. 3,378,511, formulation C.

EXAMPLE 69

An elastomeric silicone composition was poured around a nominal 2 ½ inches threaded malleable iron pipe plug and cured thereby producing an elastomeric mold of the pipe fitting.

Employing the procedure of Example 1-A, the following composition was poured into the above prepared mold.
- 45 grams of Voranol CP-260
- 68 grams of PAPI
- 50 grams of propylene carbonate
- 1 cc of stannous octoate The composition suddenly solidified within about 30 seconds after catalyst addition and after about another 60 seconds, a polyurethane threaded pipe plug was removed from the mold. The cast object, pipe plug, had a density greater than 1 gram/cc.

EXAMPLE 70

A 3 ½ inches diameter spur gear was removed from a gear box having a gear and pinion arrangement and an elastomeric silicone mold of said spur gear was prepared.

Employing the procedure of Example 1-A, the following composition was poured into the mold.

EXAMPLE 71 — Preparation of Decorative Article

A sheet of polyethylene was vacuum formed over a half relief sculptured horse's head to yield a thin walled polyethylene mold of said horse's head.

The following non-flexible urethane composition prepared by the procedure of Example 1-A was poured into the mold:
- 45 grams of Voranol CP-260
- 72 grams of an isocyanate terminated prepolymer prepared from toluene diisocyanate and tetrabromobisphenol A, said prepolymer having an NCO content of 29.4%
- 30 grams of triethylbenzene
- 1 cc of lead octoate catalyst.

The composition suddenly solidified in about 20 seconds after catalyst addition and within about 60 seconds after catalyst addition on a rigid polyurethane replica of the horse head having a density greater than 1 gram/cc was removed from the mold.

EXAMPLE 72

In each of the following experiments, all of the components except the catalyst were blended together and then the catalyst was added and blended. The resultant mixture was then poured into a 250 cc polyethylene beaker.

The compositions and results are given in the following table. The times were measured from the instant the catalyst was added.

|  | EXPERIMENT A (Present Invention) | EXPERIMENT B (Comparative) | EXPERIMENT C (Comparative) |
|---|---|---|---|
| POLYOL[1], grams | 33 | 33 | 33 |
| TDI[2], grams | 33 | 33 | 33 |
| ATB[3], grams | 20 | 20 | 20 |
| NMM[4], cc | 0 | 0.5 | 0 |
| TEDA[5], cc | 0 | 0 | 0.5 |
| PBO[6], cc | 0.5 | 0 | 0 |
| Time for solidification, sec. | 10 | >300** | >720*** |
| Time solid casting was removed from the mold, sec. | 20 | N.D.* | N.D.* |

*N.D. = not determined.
**Composition was still liquid after 300 seconds.
***Composition was still liquid after 720 seconds.
[1]The polyol employed was the reaction product of glycerine with propylene oxide to an equivalent weight of about 87.
[2]TDI = an 80/20 mixture of 2,4-/2,6-toluene diisocyanate having an NCO equivalent weight of about 87.
[3]ATB = acetylene tetrabromide.
[4]NMM = N-methylmorpholine.
[5]TEDA — a 33% solution of triethylenediamine in dipropyleneglycol.
[6]PBO = lead octoate containing 24% Pb.

- 60 grams of Voranol CP-260
- 60 grams of toluene diisocyanate
- 30 grams of tetrahydronaphthalene
- 0.2 cc of lead napthenate (24% Pb)

Within about 25 seconds after catalyst addition, the composition suddenly soliffified and a rigid polyurethane spur gear was removed from the mold after the lapse of an additional 45 seconds. The gear had a density of greater than 1 gram/cc.

EXAMPLE 73

In each of the following experiments, all of the components except the catalyst were blended together and then the catalyst was added and blended. The resultant mixture was then poured into a 250 cc polyethylene beaker.

In each of the following experiments, the polyol employed was the reaction product of glycerine with propylene oxide to an equivalent weight of about 87.

In each of the following experiments, the polyisocyanate employed was an 80/20 mixture of 2,4-/2,6-toluene diisocyanate (TDI) having an NCO equivalent weight of about 87.

In each of the following experiments acetylene tetrabromide (ATB) was employed as the modifier.

In each of the following experiments, the catalysts employed and their designations are as follows:
DBTDL = dibutyl tin dilaurate
CdOc = cadmium octoate
CoOc = 1 part cobalt octoate dissolved in 2 parts triethyl benzene
ZN = zinc naphthenate
SbOc = antimony octoate
PMP = 1 part phenyl mercuric propionate in 1 part of propylene carbonate.

The compositions and results of the experiments are given in the following table.

20 grams of oleic acid.
1 cc of antimony octoate catalyst.

The mixture suddenly solidified within about 30 seconds and was demolded within about 90 seconds after catalyst addition. The solid, rigid cast object had a density of about >1 g/cc and a Shore D hardness of about >85.

EXAMPLE 76

The procedure of Example 1-A eas employed with the following components:

30 grams of an adduct of glycerine with 1,2-propylene oxide having an average molecular weight of about 260.

30 grams of an 80/20 mixture of 2,4-/2,6-toluene diisocyanate.

20 grams of oleic acid
1 gram of stannous naphthanate catalyst.

The mixture suddenly solidified within about 30 seconds and was demolded within about 60 seconds after catalyst addition. The solid, rigid cast object had a

|  | EXPERIMENT NO. | | | | | |
|---|---|---|---|---|---|---|
|  | 1 | 2 | 3 | 4 | 5 | 6 |
| Polyol, grams | 33 | 33 | 33 | 33 | 33 | 33 |
| TDI, grams | 33 | 33 | 33 | 33 | 33 | 33 |
| ATB, grams | 20 | 20 | 20 | 20 | 20 | 20 |
| DBTDL., cc | 0.5 | — | — | — | — | — |
| CdOc, cc | — | 0.5 | — | — | — | — |
| CoOc, cc | — | — | 0.5 | — | — | — |
| ZN, cc | — | — | — | 0.5 | — | — |
| SbOc, cc | — | — | — | — | 0.5 | — |
| PMP, cc | — | — | — | — | — | 0.5 |
| Time * for solidification, sec. | 20 | 30 | 20 | 45 | 40 | 30 |
| Time * solid casting was removed from the mold, sec. | 40 | 60 | 60 | 120 | 90 | 60 |
| Density, g/cc | 1.3 | 1.3 | 1.3 | 1.3 | 1.3 | 1.3 |

* The times were measured from the instant the catalyst was added.

EXAMPLE 74

The procedure of Example 1-A was employed, except that the mixture was poured into a Mylar tray, with the following components:

50 grams of an adduct of glycerine with 1,2-propylene oxide having an average molecular weight of about 260, 50 grams of an 80/20 mixture of 2,4-/2,6-toluene diisocyanate having an NCO equivalent weight of about 87.

30 grams of Empol 1010 ( $C_{36}$ dibasic acid containing 97% $C_{36}$ dibasic acid and 3% $C_{54}$ dibasic acid, commercially available from Emery Industries, Inc.), 1 cc of T-9 catalyst (a stannous octoate catalyst solution containing 28% tin, 97% of which is stannous, commercially available from M & T Chemicals).

The mixture suddenly solidified within about 30 seconds and was demolded within about 75 seconds after catalyst addition. The solid, rigid cast sheet had a density of about >1 g/cc, a Shore D hardness of about >85 and a tensile strength of about 9282 psi at an elongation of about 12%.

EXAMPLE 75

The procedure of Example 1-A was employed with the following components:

30 grams of an adduct of glycerine with 1,2-propylene oxide having an average molecular weight of about 260.

30 grams of an 80/20 mixture of 2,4-/2,6-toluene diisocyanate.

density of about >1 g/cc and a Shore D hardness of about >85.

EXAMPLE 77

The procedure of Example 1-A was employed with the following components:

30 grams of an adduct of glycerine with 1,2-propylene oxide having an average molecular weight of about 260.

30 grams of an 80/20 mixture of 2,4,-/2,6-toluene diisocyanate.

5 grams of Empol 1010
5 grams of octanoic acid
5 grams of tall oil
5 grams of oleic acid
1 cc of T-9 catalyst.

The mixture suddenly solidified within about 30 seconds and was demolded within about 90 seconds after catalyst addition. The solid, rigid, cast object had a density of about >1 g/cc and a Shore D hardness of about >85.

We claim:
1. A non-elastomeric, non-cellular, solid polymer having a density of at least about 1 gram/cc and a percent elongation less than 80 resulting from admixture of the components of a composition comprising:
   A. a polyether polyol having from 3 to about 8 hydroxyl groups and a hydroxyl equivalent weight between about 75 and about 230;
   B. an organic polyisocyanate,

C. a liquid modifier compound having a boiling point above about 150° C selected from the group consisting of fatty acids, fatty oils, and mixtures thereof, and D. a non-amine-containing catalyst for urethane formation, which is an organo metal compound; wherein components (A) and (B) are present in amounts so as to provide an NCO:OH ratio of from about 0.8:1 to about 2:1; component (C) is present in quantities of from about 20 to about 50 percent with the proviso that when component (B) is an NCO-containing prepolymer containing less than about 40% NCO groups by weight, component (C) is employed in quantities of from about 10% to about 50% by weight of the sum of components (A), (B) and (C); and component (D) is present in quantities of from about 0.2 to about 10 percent by weight of the sum of the weights of components (A), (B) and (C); and wherein said polymer can be demolded within less than about 5 minutes, without the application of an external source of heat, after admixture of said composition.

2. The composition of Claim 1 wherein components (A) and (B) are present in quantities such that the NCO:OH ratio of the (A) and (B) components is from about 0.95:1 to about 1.1:1, component (C) is present in quantities of from about 30 to about 50 percent by weight of the sum of components (A), (B) and (C) and wherein component (D) is present in quantities of from about 0.5 to about 3 percent by weight of the sum of the weights of components (A), (B) and (C).

3. The composition of Claim 2 wherein component (D) is an organo-metal compound of a metal selected from tin, zinc, lead, mercury, cadmium, bismuth and antimony.

4. The composition of claim 3 wherein component (C) is a fatty acid.

5. The composition of claim 4 wherein component (C) is oleic acid, octanoic acid or a $C_{36}$ dibasic acid.

6. The composition of claim 5 wherein component (D) is an organo-tin compound or an organo-lead compound.

7. The composition of claim 3 wherein component (C) is a fatty oil.

8. The composition of claim 7 wherein component (C) is castor oil, tall oil or linseed oil.

9. The composition of claim 8 wherein component (D) is an organo-tin compound or an organo-lead compound.

10. The articles resulting from casting the compositions of claim 1.

11. The articles of claim 10 wherein said articles are furniture components.

12. The articles of claim 10 wherein said articles are decorative objects.

13. The articles of claim 10 wherein said articles are machine components.

14. A process for producing solid, rigid, polyurethane articles having a density of at least 1 g/cc, a percent elongation of less than 80, and which can be demolded within a period of about 5 minutes without the addition of an external source of heat which process comprises:
1. admixing the components of a composition comprising A. a polyether polyol having from 3 to about 8 hydroxyl groups and a hydroxyl equivalent weight between about 75 and about 230.

B. an organic polyisocyanate,

C. A liquid modifier compound having a boiling point above about 150° C selected from the group consisting of fatty acids, fatty oils, and mixtures thereof, and D. a non-amine-containing catalyst for urethane formation, which is an organo metal compound; wherein components (A) and (B) are present in amounts so as to provide an NCO:OH ratio of from about 0.8:1 to about 2:1; component (C) is present in quantities of from about 20 to about 50 percent with the proviso that when component (B) is an NCO-containing prepolymer containing less than about 40% NCO groups by weight, component (C) is employed in quantities of from about 10% to about 50% by weight of the sum of components (A), (B) and (C); and component (D) is present in quantities of from about 0.02 to about 10 percent by weight of the sum of the weights of components (A), (B) and (C); and wherein said polymer can be demolded within less than about 5 minutes, without the application of an external source of heat, after admixture of said composition;

2. placing the admixed composition into a suitable mold wherein said composition solidifies within less than about 5 minutes to a solid having the aforesaid density and elongation; and 3. subsequently demolding the resultant article from the mold.

15. The process of claim 14 wherein components (A) and (B) are present in quantities such that the NCO:OH ratio of the (A) and (B) components is from about 0.95:1 to about 1.1:1, component (C) is present in quantities of from about 30 to about 50 percent by weight of the sum of components (A), (B) and (C) and wherein component (D) is present in quantities of from about 0.5 to about 3 percent by weight of the sum of the weights of components (A), (B) and (C).

16. The process of claim 15 wherein component (D) is an organo-metal compound of a metal selected from tin, zinc, lead, mercury, cadmium, bismuth and antimony.

17. The process of claim 16 wherein component (C) is a fatty acid.

18. The process of claim 17 wherein component (C) is oleic acid, octanoic acid or a $C_{36}$ dibasic acid.

19. The process of claim 18 wherein component (D) is an organo-tin compound or an organo-lead compound.

20. The process of claim 16 wherein component (C) is a fatty oil.

21. The process of claim 20 wherein component (C) is castor oil, tall oil or linseed oil.

22. The process of claim 21 wherein component (D) is an organo-tin compound or an organo-lead compound.

23. The process of claim 14 wherein said mold is that of a furniture component.

24. The process of claim 14 wherein said mold is that of a decorative object.

25. The process of claim 14 wherein said mold is that of a machine component.

* * * * *

UNITED STATES PATENT AND TRADEMARK OFFICE
CERTIFICATE OF CORRECTION

PATENT NO. : 3,996,172
DATED : Dec. 7, 1976
INVENTOR(S) : Franciszek Olstowski, et al.

It is certified that error appears in the above-identified patent and that said Letters Patent are hereby corrected as shown below:

Col. 34, line 21, Claim 14, "0.02" should be --0.2--.

Signed and Sealed this

Twelfth Day of April 1977

[SEAL]

Attest:

RUTH C. MASON
*Attesting Officer*

C. MARSHALL DANN
*Commissioner of Patents and Trademarks*